United States Patent [19]
Ruane et al.

[11] 3,766,956
[45] Oct. 23, 1973

[54] TIRE STRUCTURE
[76] Inventors: George W. Ruane, 165 W. McMillan St., Cincinnati, Ohio 45219; George W. Tracy, Jr., 11742 Culver Blvd., Culver City, Calif. 90230
[22] Filed: Sept. 13, 1971
[21] Appl. No.: 179,773

[52] U.S. Cl. ............................................. 152/208
[51] Int. Cl. ........................................... B60c 11/14
[58] Field of Search.................... 152/211, 208, 331

[56] References Cited
UNITED STATES PATENTS
| | | | |
|---|---|---|---|
| 2,480,548 | 8/1949 | Carhart.............................. | 152/331 |
| 3,340,921 | 9/1967 | Garfinkle........................... | 152/208 |
| 2,781,313 | 2/1957 | Ferguson........................... | 152/208 |

*Primary Examiner*—James B. Marbert
*Attorney*—Pearce & Schaeperklaus

[57] ABSTRACT

A vehicle tire having reciprocating studs. A diaphragm mounted inside the tire engages heads of the studs and when air under pressure is introduced between the diaphragm and a boot mounted thereinside, portions of the diaphragm engaging the heads of the studs advance outwardly driving the studs to operative position.

4 Claims, 8 Drawing Figures

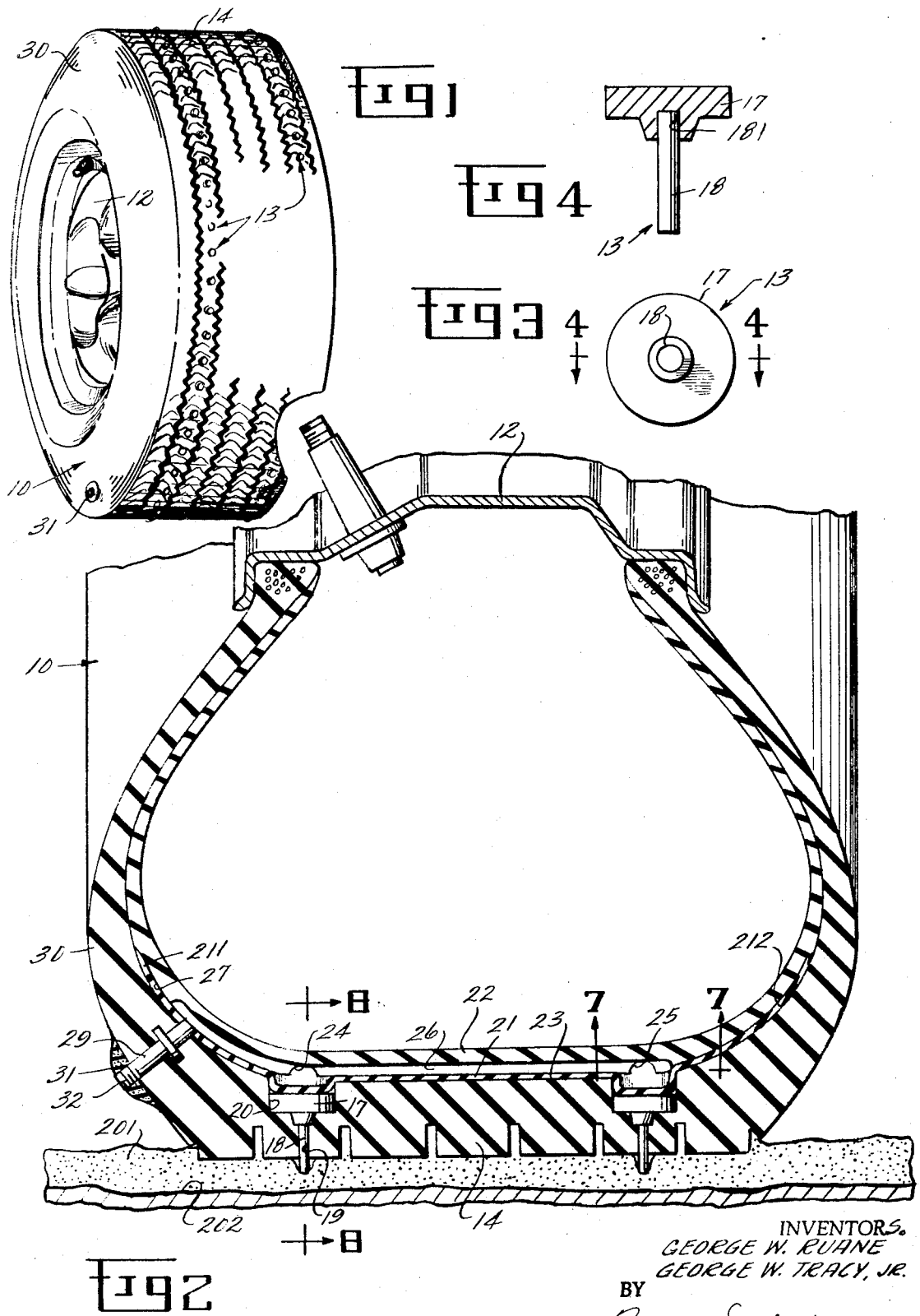

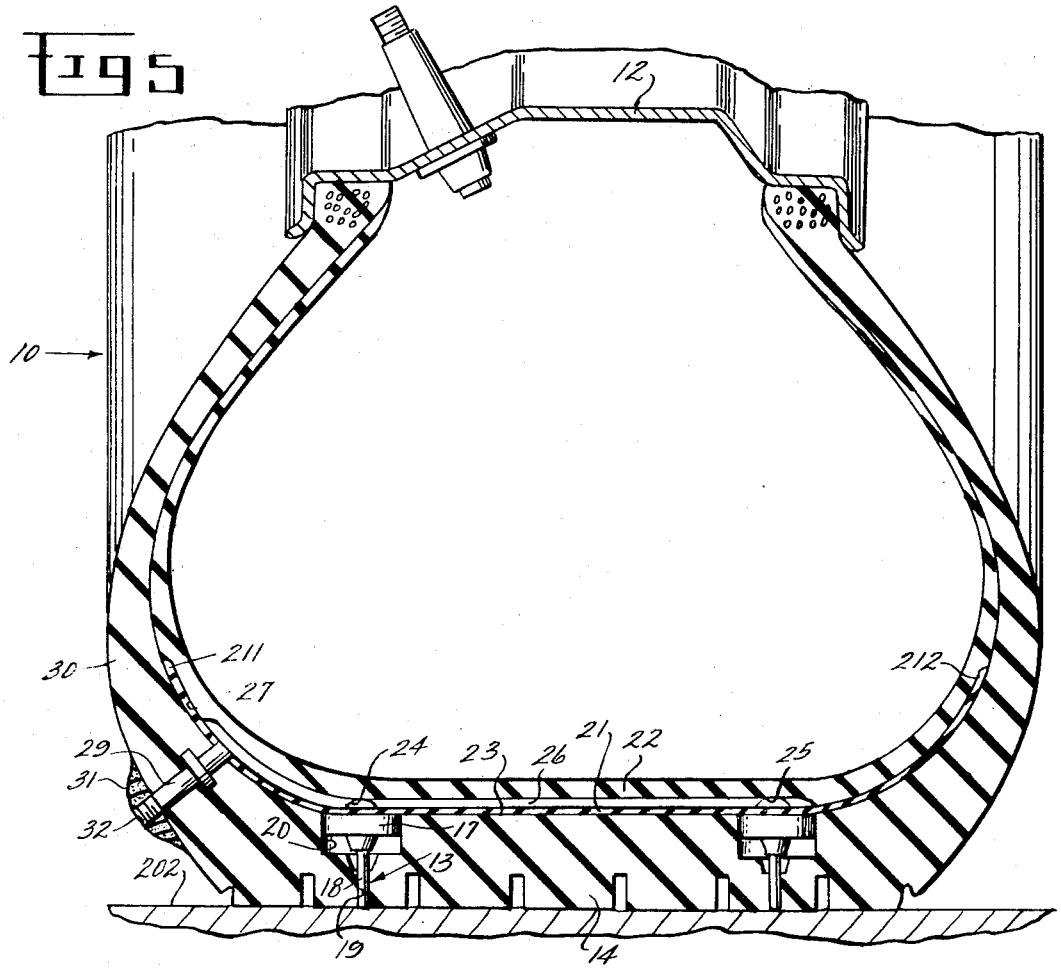
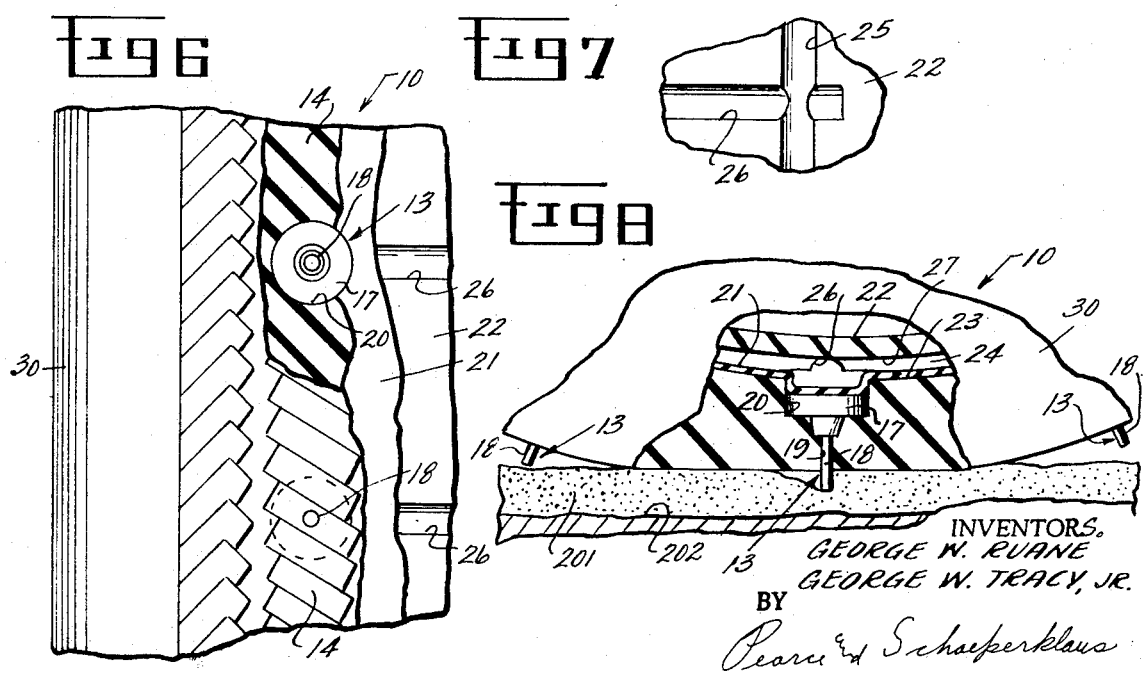

TIRE STRUCTURE

This invention relates to vehicle tires. More particularly, this invention relates to the construction of studded vehicle tires.

An object of this invention is to provide a vehicle tire having studs which are retracted when not required.

A further object of this invention is to provide a vehicle tire which has studs that are normally retracted and which includes means for automatically extending the studs into operative position when required.

Briefly, this invention provides a tire equipped with studs that extend to a diaphragm which is mounted between an outer tread portion of the tire and an inner casing portion or boot member. When air under pressure or other fluid is introduced into a channel between the diaphragm and the boot member, sections of the diaphragm opposite the studs move outwardly to advance the studs into operative position. When air is released from the channel, the studs are released to return to inoperative position.

The above and other objects and features of the invention will be apparent to those skilled in the art to which this invention pertains from the following detailed description and the drawings in which:

FIG. 1 is a perspective view of a vehicle tire constructed in accordance with an embodiment of this invention, the tire being shown mounted on a wheel;

FIG. 2 is a fragmentary view in transverse section of the tire and a portion of the wheel on an enlarged scale, studs thereof being shown in extended position;

FIG. 3 is a bottom plan view of one of a plurality of studs which are mounted in the tire;

FIG. 4 is a view in section taken on the line 4—4 in FIG. 3;

FIG. 5 is a fragmentary view in transverse section of the tire and a portion of the wheel showing studs in retracted position;

FIG. 6 is a fragmentary bottom plan view of the tire shown in FIGS. 1, 2, and 5, parts being broken away to reveal details of construction;

FIG. 7 is a view in section taken on the line 7—7 in FIG. 2; and

FIG. 8 is a view in section taken on the line 8—8 in FIG. 2.

In the following detailed description and the drawings, like reference characters indicate like parts.

In FIGS. 1, 2, and 5 is shown a vehicle tire 10, which is mounted on a wheel 12. A plurality of studs 13 are arranged in a main tread portion 14 of the tire.

As shown in FIGS. 3 and 4, each of the studs 13 includes a generally cylindrical head or shank portion 17 and a pin portion 18 of rigid abrasion resistant material. The pin portion 18 can be brazed in a socket 181 (FIG. 4) in the head, and the head and the pin portion can be coaxial. The main tread portion 14 of the tire is provided with radial bores 19 (FIGS. 2 and 5) in each of which the pin portion of one of the studs is received and a counterbore portion 20 in which the head of the stud is received. Each stud 13 can slide between a retracted position shown in FIG. 5 and an advanced position shown in FIG. 2 in which an outer end section of the pin portion thereof extends outwardly of the main tread portion of the tire to grip into ice 201 on a road surface 202. The studs are moved to advanced position by a diaphragm 21, which is mounted inside the tread portion underlying the heads of the studs. A boot member 22, which is adhesively attached to the diaphragm along edges 211 and 212 thereof, is mounted inside the diaphragm 21 and the tread portion 14 of the tire and holds the diaphragm in engagement with an inner wall 23 of the main tread portion. The diaphragm can be made of rubber-like elastic material similar to that of which inner tubes are made. The boot member 22 can be made of stiffer material such as rubber impregnated fabric cords such as are ordinarily used in a tire body. Circumferential air channels 24 and 25 and a transverse air channel 26 are formed in an outer face 27 of the boot member 22. The air channels communicate with each other as shown in FIG. 7. The circumferential air channels underlie the portions of the diaphragm 21 immediately inside the head portions of the studs. The transverse air channel 26 communicates with a valve 29 (FIGS. 2 and 5). The valve 29 can be molded in a side wall portion 30 of the tire. A rubber grommet 31 molded to the material of the tire surrounds an outer end portion 32 of the valve but can be displaced to permit connection of an air line (not shown). The valve can be constructed to hold air under pressure in the air channels 24, 25, and 26. When air under pressure is introduced through the valve 29 into the channels 24, 25, and 26, the diaphragm is caused to advance into the counterbore portions 20, as shown in FIGS. 2 and 8, to move the studs 13 to advanced position. When the air is released from the channels through the valve 29 by opening of the valve 29, pressure behind the diaphragm 21 is released and the studs 13 can move back to the retracted position shown in FIG. 5.

When there is ice on the road, air can be introduced through the valve 29 to cause the studs to be held in advanced position as long as required. At other times, air pressure in the channels can be released to permit the studs to return to retracted position. The boot member 22 is sufficiently stiff that it does not substantially advance outwardly opposite the studs even when pressure in the channels is released.

The tire structure illustrated in the drawings and described above is subject to structural modification without departing from the spirit and scope of the appended claims.

Having described our invention, what we claim as new and desire to secure by letters patent is:

1. A vehicle tire which comprises a main body including an annular tread portion, there being a plurality of substantially radially extending bores in the tread portion, studs mounted in the bores, each of the studs being movable between an advanced position at which an outer end portion of the stud extends outwardly of the tread portion and a retracted position in which the outer end portion of the stud is housed inside the tread portion, a diaphragm member mounted inside the tread portion and engageable with heads of the studs, and means for moving portions of the diaphragm opposed to the heads of the studs outwardly and inwardly to advance and to permit retraction of the studs, each of the bores being counterbored at an inner end thereof, each of the studs having an enlarged head which reciprocates in the counterbore of the associated bore, the portions of the diaphragm opposed to the heads of the studs entering the counterbores in sealing relation therewith when the studs are advanced.

2. A vehicle tire as in claim 1 wherein a boot member is mounted inside the diaphragm and holds the diaphragm against an inner wall of the tread portion of the tire and the means for moving portions of the diaphragm opposed to heads of the studs includes means for introducing fluid under pressure between the diaphragm and the boot member opposite heads of the studs so that the diaphragm advances outwardly opposite the studs to advance the studs.

3. A vehicle tire as in claim 2 wherein the means for introducing fluid under pressure includes a valve extending from outside the body to the interface between the boot member and the diaphragm and conduit means from the valve at the interface to the diaphragm portions opposite the heads of the studs.

4. A vehicle tire as in claim 3 wherein the channels are formed in the boot member at the face thereof which engages the diaphragm.

* * * * *